(12) United States Patent
Jones et al.

(10) Patent No.: US 10,794,012 B2
(45) Date of Patent: Oct. 6, 2020

(54) MULTI-AXIAL FABRIC

(75) Inventors: David Michael Jones, Dacula, GA (US); Randall Eugene Johnson, Lula, GA (US); Michael D. Samueloff, Troy, MI (US)

(73) Assignee: NICOLON CORPORATION, Pendergrass, GA (US)

(*) Notice: Subject to any disclaimer, the term of this patent is extended or adjusted under 35 U.S.C. 154(b) by 448 days.

(21) Appl. No.: 13/607,209

(22) Filed: Sep. 7, 2012

(65) Prior Publication Data

US 2013/0244521 A1    Sep. 19, 2013

Related U.S. Application Data

(60) Provisional application No. 61/532,789, filed on Sep. 9, 2011.

(51) Int. Cl.
*E01C 11/16* (2006.01)
*B32B 5/26* (2006.01)
(Continued)

(52) U.S. Cl.
CPC .............. *E01C 11/16* (2013.01); *B32B 5/06* (2013.01); *B32B 5/12* (2013.01); *B32B 5/26* (2013.01); *D04B 21/165* (2013.01); *D04H 3/04* (2013.01); *E01C 7/145* (2013.01); *E01C 7/185* (2013.01); *E01C 7/325* (2013.01); *E01C 11/005* (2013.01); *E01C 11/165* (2013.01);
(Continued)

(58) Field of Classification Search
CPC ...... E01C 3/06; E01C 11/16; E01C 2201/167; E01C 7/145; E01C 7/147; E01C 7/185; E01C 11/005; B32B 5/12; B32B 5/06; B32B 5/26; Y10T 442/643; Y10T 442/406; Y10T 428/27; Y10T 428/249921; D04H 3/04; D04H 3/05
USPC .................................................. 442/282, 326
See application file for complete search history.

(56) References Cited

U.S. PATENT DOCUMENTS 3,867,243 A * 2/1975 Stoller ............................ 428/85
4,151,023 A * 4/1979 Platt ........................ D04H 1/48
                                                                156/148
(Continued)

FOREIGN PATENT DOCUMENTS

EP            0361796    *  4/1990    ............ B29C 67/14
EP          361796 A2       4/1990
(Continued)

OTHER PUBLICATIONS

Celanese, "Complete Textile Glossary, 2001, Celanese Acetate LLC. Exert for Tow".*
(Continued)

*Primary Examiner* — Jennifer A Gillett
(74) *Attorney, Agent, or Firm* — Cantor Colburn LLP

(57) ABSTRACT

The present invention is directed to a multi-axial fabric which is dimensionally-stabilized. The composite fabric has a substrate and a plurality of first, second, third, and fourth strands disposed across the substrate and oriented in non-parallel directions with respect to one another. Binding fiber secures the aforementioned strands to the substrate. The composite fabric can be substantially free of more than three strands overlapping at a common position on the substrate. A road employing the multi-axial fabric is described.

31 Claims, 3 Drawing Sheets

(51) Int. Cl.
*B32B 5/12* (2006.01)
*B32B 5/06* (2006.01)
*D04H 3/04* (2012.01)
*E01C 7/14* (2006.01)
*E01C 7/18* (2006.01)
*E01C 7/32* (2006.01)
*E01C 11/00* (2006.01)
*D04B 21/16* (2006.01)

(52) U.S. Cl.
CPC ........... *D10B 2403/02412* (2013.01); *D10B 2505/204* (2013.01); *Y10T 428/249921* (2015.04); *Y10T 428/27* (2015.01); *Y10T 442/30* (2015.04); *Y10T 442/406* (2015.04); *Y10T 442/643* (2015.04)

(56) References Cited

U.S. PATENT DOCUMENTS

| | | | | |
|---|---|---|---|---|
| 4,342,813 | A * | 8/1982 | Erickson | D04H 1/48 |
| | | | | 264/113 |
| 4,699,542 | A | 10/1987 | Shoesmith | |
| 4,957,390 | A | 9/1990 | Shoesmith | |
| 5,055,242 | A * | 10/1991 | Vane | B29C 70/202 |
| | | | | 156/148 |
| 5,110,627 | A | 5/1992 | Shoesmith et al. | |
| 5,246,306 | A | 9/1993 | Shoesmith et al. | |
| 5,308,424 | A * | 5/1994 | Sasaki | B32B 5/02 |
| | | | | 156/177 |
| 5,393,559 | A | 2/1995 | Shoesmith et al. | |
| 5,795,835 | A * | 8/1998 | Bruner et al. | 442/310 |
| 5,809,805 | A * | 9/1998 | Palmer | D04H 3/002 |
| | | | | 442/314 |
| 6,503,853 | B1 * | 1/2003 | Kassner | E01C 11/165 |
| | | | | 428/102 |
| 6,648,547 | B2 | 11/2003 | Jones et al. | |
| 7,001,112 | B2 | 2/2006 | Walsh | |
| 7,059,800 | B2 * | 6/2006 | Jones | E01C 11/165 |
| | | | | 404/82 |
| 7,207,744 | B2 * | 4/2007 | Jones et al. | 404/75 |
| 2001/0006866 | A1 * | 7/2001 | Kuroiwa | B29C 70/202 |
| | | | | 442/366 |
| 2002/0121720 | A1 * | 9/2002 | Davies | B29C 70/081 |
| | | | | 264/103 |
| 2003/0224143 | A1 * | 12/2003 | Ianniello | B32B 5/02 |
| | | | | 428/137 |
| 2005/0130545 | A1 * | 6/2005 | Bansal | D04H 1/54 |
| | | | | 442/415 |
| 2006/0222837 | A1 * | 10/2006 | Kismarton | 428/297.4 |
| 2007/0253773 | A1 | 11/2007 | Huang et al. | |
| 2008/0026663 | A1 * | 1/2008 | Zhang | 442/398 |
| 2010/0212808 | A1 * | 8/2010 | Horne | 156/93 |

FOREIGN PATENT DOCUMENTS

| | | |
|---|---|---|
| FR | 2590915 A2 | 6/1987 |
| WO | WO 2007067951 A1 * | 6/2007 |
| WO | 2011113752 A1 | 3/2010 |

OTHER PUBLICATIONS

Celanese, "Complete Textile Glossary, 2001, Celanese Acetate LLC. Exert for Yarn.".*
Plastics Design Library Staff. (1995). Permeability and Other Film Properties of Plastics and Elastomers. William Andrew Publishing/Plastics Design Library.*
Lee, Stuart M.. (1993). Handbook of Composite Reinforcements. John Wiley & Sons.*
Dong et al., "Numerical Analysis of Tensile Behavior of Geogrids with Rectangular and Triangular Apertures," Geotextiles and Geomembranes 29 (2011) 83-91, 9 pages.
International Search Report; International Application No. PCT/US2012/054279; International Filing Date Jul. 9, 2012; Priority Date Sep. 9, 2011; Applicant Nicolon Corporation d/b/a Tencate; 5 pages.
Written Opinion of the International Searching Authority; International Application No. PCT/US2012/054279; International Filing Date Jul. 9, 2012; Priority Date Sep. 9, 2011; Applicant Nicolon Corporation, d/b/a Tencate, 10 pages.
"Complete Textile Glossary", Celanese Acetate, 2001, p. 1-210.
Wingate, Isabel B., "Fairchild's Dictionary of Textiles", Fairchild Publications, Inc., New York, Fourth Printing, 1975, p. 235.

* cited by examiner

MULTI-AXIAL FABRIC

CROSS-REFERENCE TO RELATED APPLICATIONS

This application claims benefit of U.S. Provisional Patent Application Ser. No. 61/532,789 filed Sep. 9, 2011, which is incorporated herein in its entirety by reference.

TECHNICAL FIELD OF THE INVENTION

The instant invention is generally related to geosynthetic fabrics employed in civil engineering projects. More specifically, the instant invention is related to a dimensionally-stabilized composite fabric, a process for making the composite fabric, and uses of the composite fabric.

BACKGROUND OF THE INVENTION

Paved surfaces such as roads and parking lots are commonly constructed with a top surface layer of asphalt paving material. Over time, the paved surface suffers deterioration and begins to crack due to the effects of traffic, heavy weight loads, temperature cycles, and other environmental causes. Cracks can accelerate deterioration due to water penetration.

Damaged paved surfaces are usually repaired by applying a new surface layer of paving material over the damaged portions or over the entire paved surface. After a paved surface with cracks is resurfaced, many times the same cracks reappear in the new surface. One way to address this problem is to make the new surface layer thicker, but this solution is neither cost effective nor long lasting.

One method to combat paved surface deterioration is to place a geosynthetic fabric on to the road bed and then pave over the fabric. However, conventional fabrics lack dimensional stability to disperse the heavy loads generated by the paving equipment, which results in damage of the fabric. Such damage often results in the fabric failing to prevent the above described deterioration.

Accordingly, there is a need for a geosynthetic fabric which has enhanced dimensional stability and improved load bearing capability to resist damage during paving operations. It is to solving this and other needs the present invention is directed.

SUMMARY OF THE INVENTION

The present invention is directed to a composite fabric. In one aspect, the composite fabric comprises a substrate and at least four sets of strand disposed across the substrate. A plurality of first strands is disposed across the substrate in a given direction. A plurality of second strands is disposed across the substrate substantially perpendicular to the first strands. A plurality of third strands is disposed across the substrate at a first oblique angle with respect to either the first or the second strands. A plurality of fourth strands is disposed across the substrate at a second oblique angle with respect to either the first or the second strands and is substantially perpendicular to the third strands. Binding fiber secures the first, second, third, and fourth strands to the substrate. Due to the orientation of the respective strands, a load positioned on the composite fabric is distributed across the first, second, third, and fourth strands.

In another aspect of the present invention, the first strands are disposed across the substrate and oriented in a first direction. The second strands are disposed across the substrate and oriented in a second direction which is non-parallel with the first direction. The third strands are disposed across the substrate and oriented in a third direction which is non-parallel with either the first or second directions. The fourth strands are disposed across the substrate and oriented in a fourth direction which is non-parallel with either of the first, second, or third directions.

The substrate can be a nonwoven substrate. In one aspect, the nonwoven substrate has a low surface area side and a high surface area side. One or more of the respective strands can be disposed on the high surface side. In addition, the composite fabric can be substantially free of more than three strands overlapping at a common position on the substrate.

A road includes a composite fabric, also known as an interlayer, a tack layer disposed on the composite fabric, and a layer of hot-mix bituminous mixture disposed on top of the tack layer and composite layer, wherein the resulting surface exhibits an increased resistance to damage. The composite fabric includes a substrate, a plurality of first strands disposed across the substrate and oriented in a first direction, a plurality of second strands disposed across the substrate and being oriented in a second direction, the second direction being non-parallel with the first direction, a plurality of third strands disposed across the substrate and being oriented in a third direction, the third direction being non-parallel with either the first or second directions, a plurality of fourth strands positioned across the substrate and being oriented in a fourth direction, the fourth direction being non-parallel with either of the first, second, or third directions, and binding fiber securing the first, second, third, and fourth strands to the substrate, the composite fabric being substantially free of more than three strands overlapping at a common position on the substrate.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the present invention will become apparent from the following description taken in conjunction with the accompanying drawings showing the elements and the various aspects of the present invention.

DETAILED DESCRIPTION OF THE INVENTION

The present invention is directed to a dimensionally-stabilized composite fabric, a method of reinforcing and waterproofing a paved surface such as a road, a parking lot, or any other type of paved surface employing such composite fabric, and a reinforced and waterproofed paved surface employing such composite fabric. Fabrics of the present invention are also referred to as multi-axial fabrics. The method can be used in the construction of a new paved surface, in the rejuvenation of an existing paved surface, either by resurfacing or by the chip seal method, or to repair a crack, pothole, or other defect in an existing paved surface.

Figure 1:
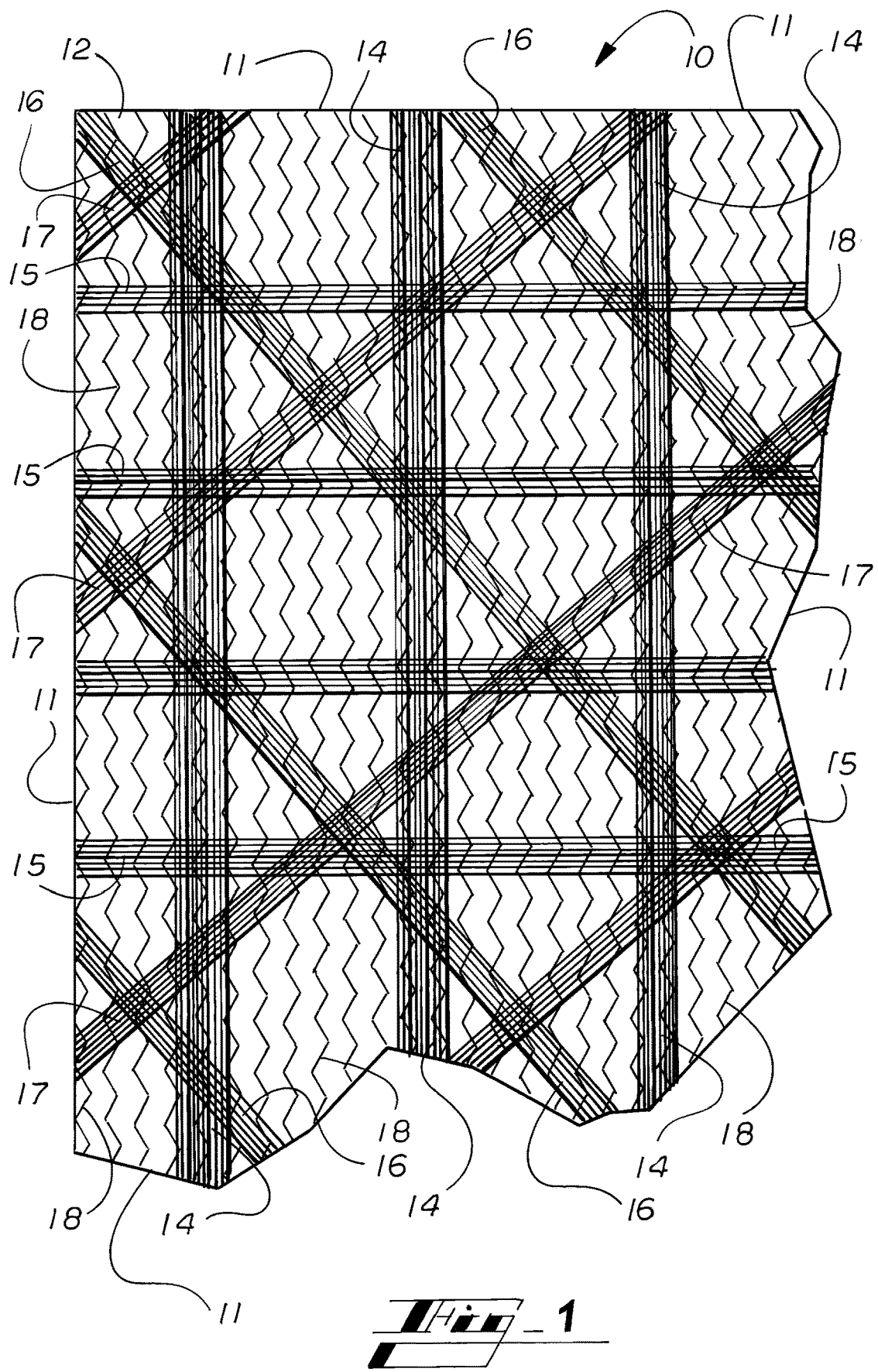
FIG. 1 is a top view of a dimensionally-stabilized composite fabric made in accordance with the present invention.
Figure 2:
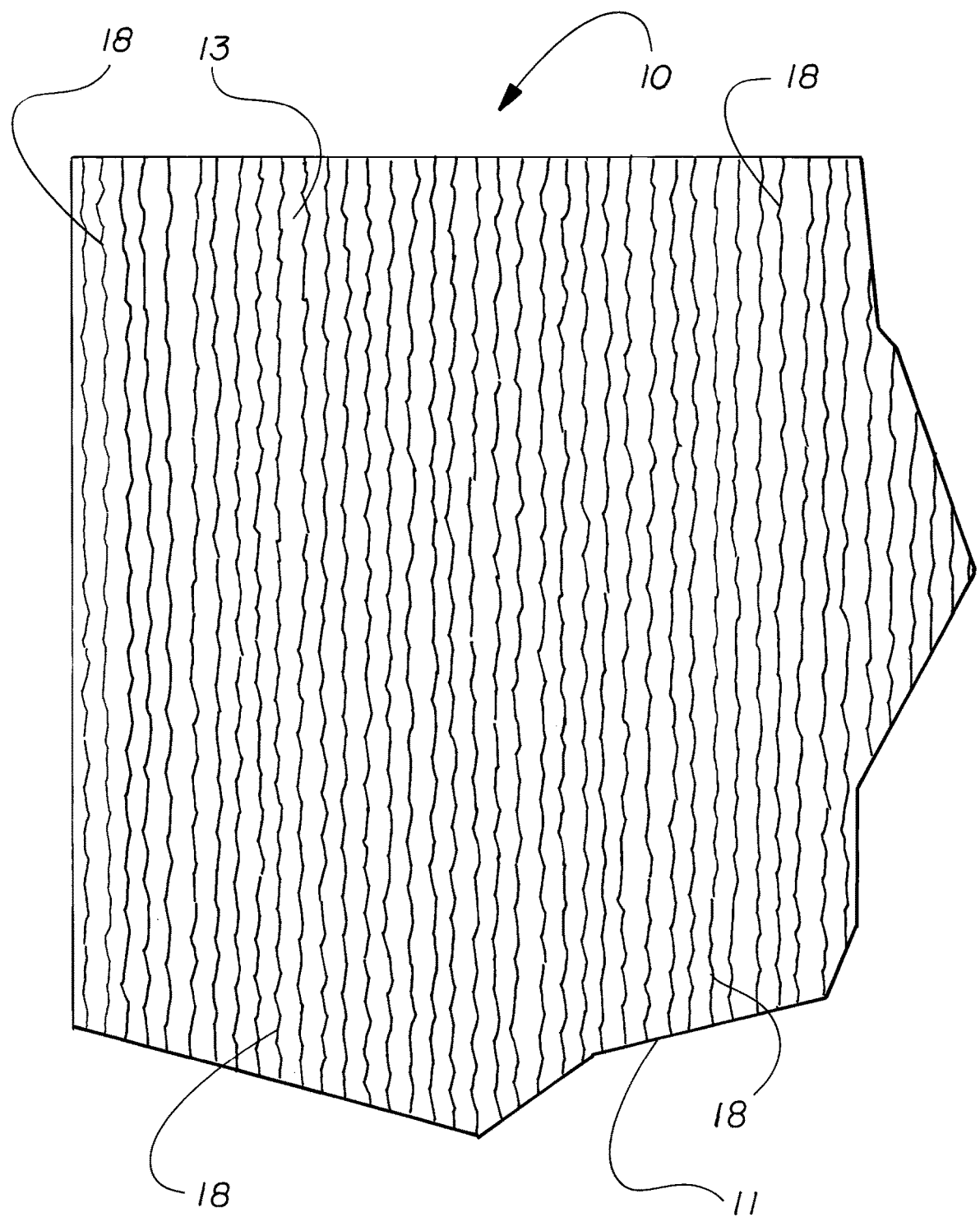
FIG. 2 is bottom view of a dimensionally-stabilized composite fabric made in accordance with the present invention.

For a fuller understanding of this disclosure and the invention described therein, reference should be made to the above and following detailed description taken in connection with the accompanying figures. When reference is made to the figures, like reference numerals designate corresponding parts throughout the several figures. FIG. 1 and FIG. 2 illustrate a composite fabric 10 in accordance with the present invention. The composite fabric 10 comprises a substrate 11 having a high surface area side 12 and a low surface area side 13. A plurality of first strands 14 and second strands 15 are disposed across the substrate 11. The second strands 15 are positioned such that they are substantially perpendicular to the first strands 14. However, it is not required for the first and second strands 14, 15 to be substantially perpendicular to one another. A plurality of third strands 16 and fourth strands 17, respectively, are disposed across the substrate 11. The third strands 16 are positioned at a first oblique angle with respect to the first strands 14. Fourth strands 17 are positioned at a second oblique angle with respect to the second strands 15 and are substantially perpendicular to the third strands 16. However, it is not required for the third and fourth strands 16, 17 to be oriented as such. In one aspect, the first and second oblique angles of the third and fourth stands 16, 17 are respectively substantially 45 degrees. A plurality of binding fiber 18 penetrates the substrate 11 and secures the first, second, third, and fourth strands 14, 15, 16, 17 to the substrate 11. When subjected to a load, the composite fabric 10 distributes the load across the first, second, third, and fourth strands 14, 15, 16, and 17. In another aspect, the composite fabric 10 distributes the load across the first, second, third, and fourth strands 14, 15, 16, 17 substantially equally.

In another aspect, the composite fabric 10 comprises a substrate, a respective plurality of first 14, second 15, third 16, forth 17, fifth (not shown), and sixth (not shown) strands, and binder fiber 18. First strands 14 are disposed across the substrate 11 and are oriented in a first direction. Second strands 15 are disposed across the substrate 11 and are oriented in a second direction. The second direction is non-parallel with the first direction. Third strands 16 are disposed across the substrate 11 and are oriented in a third direction. The third direction is non-parallel with either the first or second directions. Fourth strands 17 are disposed across the substrate 11 and are oriented in a fourth direction. The fourth direction is non-parallel with either of the first, second, or third directions. Fifth strands, which are optional, are disposed across the substrate 11 and are oriented in a fifth direction. The fifth direction is non-parallel with either of the first, second, third, or fourth directions. Sixth strands, which are optional, are disposed across the substrate 11 and are oriented in a sixth direction. The sixth direction is non-parallel with either of the first, second, third, fourth, or fifth directions. Binding fiber 18 secures the first, second, third, fourth, fifth, and sixth strands to the substrate 11. Yet, in another aspect, the composite fabric is substantially free of more than three strands overlapping at a common position on the substrate. Still yet, in another aspect, no more than three strands overlap at a common position on the substrate 11. Overlap of the strands can occur on the same side of the substrate 11. Additionally, overlap of the strands can occur when one of the respective strands is disposed on one side of the substrate 11 and the other two strands are disposed on the opposite side.

Additional strand groups can be disposed on the substrate with the caveat that each additional strand group is positioned in a different direction than any other group of strands. A group of strands means that the strands are disposed on the substrate 11 and when the group comprises more than one strand and such strands are spaced-apart from and substantially parallel to one another.

The distance between respective strands of a group (strand spacing) can be the same or different. In one aspect, strand spacing is in a range between about 0.5 to about 2.5 inches. In another aspect, stand spacing is in a range between about 0.5 to about 2.0 inches. Still, in another aspect, stand spacing is in a range between about 1 to about 2 inches. Yet, in another aspect, stand spacing is in a range between about 1 to about 1.5 inches. Typically, the strands of a group are equidistantly space, but not required. As an example, the first strands 14 comprise several strands disposed on the substrate 11 that are spaced-apart from one another and are substantially parallel to one another. As illustrated in FIG. 1, the respective strands of the first strands 14 are equally spaced from one another; however, equal spacing is not required. Binding fiber 18 secures the first, second, third, fourth, fifth, and sixth strands to the substrate 11. In one aspect, no more than three strands overlap at a common position on the substrate 11.

As illustrated, the first, second, third, and fourth strands 14, 15, 16, 17 are positioned on the high surface area side 12 of the substrate 11. In another aspect, one or more of the first, second, third, and fourth stands 14, 15, 16, and 17 are positioned on the low surface area side 13 of the substrate 11. Furthermore, as illustrated, the intersection of the first and second strands 14, 15 and are offset with respect to the intersection of the third and fourth strands, 16 and 17. By providing this offset, typically, no more that three of the four strands 14, 15, 16, and 17 overlap one another at a given position on the substrate. As a result, the composite fabric 10 is substantially free of protrusions extending outwardly from the substrate 11 and thereby provides a composite fabric 10 having a substantially constant thickness. By avoiding protrusions, the composite fabric 10 lies substantially flat and can be rolled for shipment substantially without protruding surfaces, thereby providing a compact roll. Moreover, the load distributing aspect of the invention is enhanced. For example, when the first, second, and third strands 14, 15, 16 intersect or overlap one another, such intersection is void of the fourth strand 17. In another aspect, the strands are positioned such that, typically, no more than any three of the first, second, third, or fourth strands 14, 15, 16, 17 overlap to any substantial amount at a common intersection. A common intersection can occur when the strands are disposed on the same side of the substrate 11 or when one or more strands are disposed on opposite sides of the substrate 11. Binder fiber 18 typically is stitched through the substrate from the high surface area side 12. In another aspect, binder fiber is stitched from the low surface area side 13. When strands are positioned on both sides of the substrate, it may be necessary to stitch the binder 18 from both sides to respectively secure the strands to the substrate. It is understood that an adhesive can replace or be used in concert with the binder fiber 18 to secure the respective strands to the substrate.

In one aspect the composite fabric 10 is a nonwoven fibrous mat made of polymer fibers. The composite fabric can be, if desired, pre-impregnated with any materials, such as asphalt, polymer, or filler, prior to application of the hot-mix bituminous mixture. In addition, a hot-melt bituminous composition can be disposed on the composite fabric 10 in the form of a layer (not shown) by conventional means. The bituminous mixture layer can be either disposed on the substrate 11 prior to the installation of the respective strands, or disposed on the strands after installed on the substrate, e.g. as an outer coating.

Suitable mineral fibers for producing the strands include fibers of a heat-softenable mineral material, such as glass, rock, slag, or basalt. In one aspect, the mineral fibers are glass fibers. Any suitable process can be used to produce the glass fibers. One such process is known as a rotary process, in which molten glass is placed into a rotating spinner which has orifices in the perimeter, wherein glass flows out the orifices to produce a downwardly falling stream of fibers which are collected on a conveyor. A second fiber forming process is a continuous process in which glass fibers are mechanically pulled from the orificed bottom wall of a feeder or bushing containing molten glass. Substantially contemporaneous with forming, the glass fibers are brought into contact with an applicator wherein a size is applied to the fibers. The sized glass fibers are then chopped to a specified length and packaged. Glass fibers made by these processes are commercially available from Owens Corning, Toledo, Ohio. Glass fibers forming the strands can be 16 micron diameter E-glass type 9501 glass fibers.

Suitable polymer fibers for producing the substrate 11 can be formed from a fibrous or fiberizable material prepared from natural organic polymers, synthetic organic polymers, or inorganic substances. Natural organic polymers can include regenerated or derivative organic polymers. Synthetic polymers include, but are not limited to, polyesters such as polyethylene terephthalate (PET), polytetrafluoroethylene (PTFE), polyamides (e.g., nylons), polypropylenes, polyphenylenes such as polyphenylene sulfide (PPS), polyolefins, polyurethanes, polycarbonates, polystyrenes, acrylics, vinyl polymers, and derivatives and mixtures thereof. In another aspect, the polymers include, but are not limited to, polyamides, polyimides, polyesters, high tenacity polyesters, polyethylene terephthalate (PET), polybutylene terephthalate, polytetrafluoroethylene (PTFE), aromatic polyesters, polyurethanes, polycarbonates, polystyrenes, acrylics, vinyl polymers, polyphenylenes, polyacrylonitriles, polyphenylene sulfide (PPS), polyphenylene oxides, fluoropolymers, acrylics, polyolefins, low density polyethylene (LDPE), linear low density polyethylene (LLDPE), high density polyethylene (HDPE), co-polymers of polyethylene, polypropylene, and higher polyolefins, polyphenylene sulfide, polyetherimide, polyetheretherketone, polylactic acid (also known as polylactide), aramids, aromatic ether ketones, vinalon, derivatives of any of such polymers, blends of any of such polymers, and any mixture thereof. Yet, in another aspect, the polymer fibers have a melting point greater than about 320° F. (160° C.), so that the substrate 11 does not melt or shrink when it is exposed to hot paving material. One skilled in the art appreciates that the polymer fiber content of the substrate 11 can be varied to achieve the desired properties, and as such the content may include about 1% by weight to about 99% by weight polymer fibers. In another aspect, the polymer fibers comprising the substrate 11 have a denier within a range between about 1.5 and about 12, and a cut length within a range between about 0.25 inch (0.64 cm) and about 2 inches (5.08 cm).

As indicated above, the substrate 11 can comprise reclaimed fibers, scrap fibers, or mixtures thereof. The reclaimed polymer fibers can be any type of reclaimed fibers suitable for producing a woven or nonwoven fabric having the desired properties. In one aspect, the reclaimed polymer fibers comprise any fiber-forming polymer suitable for textile applications, including, but not limited to, polyamides such as nylons (e.g., nylon 6, nylon 6,6, and nylon 6,12), polyesters, polypropylenes, polyethylenes, poly(trimethylene terephthalate), poly(ethylene terephthalate), ethylene-vinyl acetate copolymer, and acrylics.

The substrate 11 can be produced by any suitable method which produces a nonwoven fibrous mat. In one aspect, the substrate 11 is produced by a wet-laid process. In this process, the fibers are dispersed into a water slurry. The water slurry can contain surfactants, viscosity modifiers, defoaming agents, or other chemical agents. Chopped fibers are then introduced into the slurry and agitated such that the fibers become dispersed. The slurry containing the fibers is then deposited onto a moving screen, and a substantial portion of the water is removed to form a web. A binder is then applied, and the resulting mat is dried to remove the remaining water and to cure the binder. The resulting nonwoven mat consists of an assembly of substantially dispersed individual fibers.

In another aspect, the substrate 11 can also be produced by a dry-laid process. In this process, fibers are chopped and air blown onto a conveyor, and a binder is then applied to form the substrate 11.

Yet, in another aspect, the substrate 11 is a nonwoven fabric formed by a conventional needle-punch process. In one aspect, such nonwoven fabric is 10-150 mils thick and comprises polypropylene fibers. In another aspect, any of the polymers mentioned herein may be used to form the substrate 11. During manufacture, the nonwoven fabric is made such that one side of the mat is heated so that the respective fibers adjacent the heat source fuse to create the low surface area side 12. The side of the substrate opposite the low surface area side 12 is the high surface area side 13. Because the high surface area side 13 is not fused, it is more absorbent.

Still, in another aspect, the substrate 11 can be a knitted fabric. When the substrate is a knitted fabric, the binder fiber 18 is incorporated with the structure of the fabric. Moreover, all strands are disposed within the matrix of the fabric as the fabric is being knitted. Knitted structural textiles and the techniques for making knitted fabrics which can be employed in the present invention are disclosed in U.S. Pat. No. 5,795,835 to Bruner et al., which is incorporated herein in its entirety by reference.

Further, in another aspect, the substrate 11 can be a woven fabric. When the substrate is a woven fabric, the binder fiber 18 is incorporated with the structure as a yarn of the fabric. Moreover, all strands are interwoven within the matrix of the fabric.

The strands, respectively and independently, can be formed from any of the polymers mentioned herein. It is not required for all strands to be formed of like material. In another aspect, the strands comprise glass fibers. Such glass fibers are thermally stable and do not melt and/or shrink when it is exposed to hot paving material. The glass fibers have higher tensile and mechanical strengths as compared to like strands made of polypropylene. In one aspect, the glass fiber stands have a basis weight within a range of from about 0.5 to about 10 pounds per hundred square feet (about 0.02 $kg/m^2$ to about 0.42 $kg/m^2$). In another aspect, the glass fiber strands have a basis weight within a range of from about 1 to about 5 pounds per hundred square feet (about 0.04 $kg/m^2$ to about 0.21 $kg/m^2$).

Binder fiber 18 likewise can comprise any of the polymers mentioned herein. In one aspect, the binder fiber 18 is a 100 denier PET multifilament. In another aspect, binder fiber 18 has a size between about 20 to about 2000 denier. The cross-sectional shape of the fibers of the multifilament can be oval, round, square, rectangular, and the like. Stitching per inch is 5 gauge or 7 gauge. Other gauges can be employed and are not critical. It will be readily apparent to one of ordinary skill in the art to select binder fiber of sufficient size, shape, and gauge to secure the strands to the substrate 11.

Uses of the inventive fabric include, but are not limited to, civil engineering projects, for example, such as a base liner for roadways, bridge bases, buildings, walls, and the like. Such applications are generally referred to as civil structures.

Figure 3:
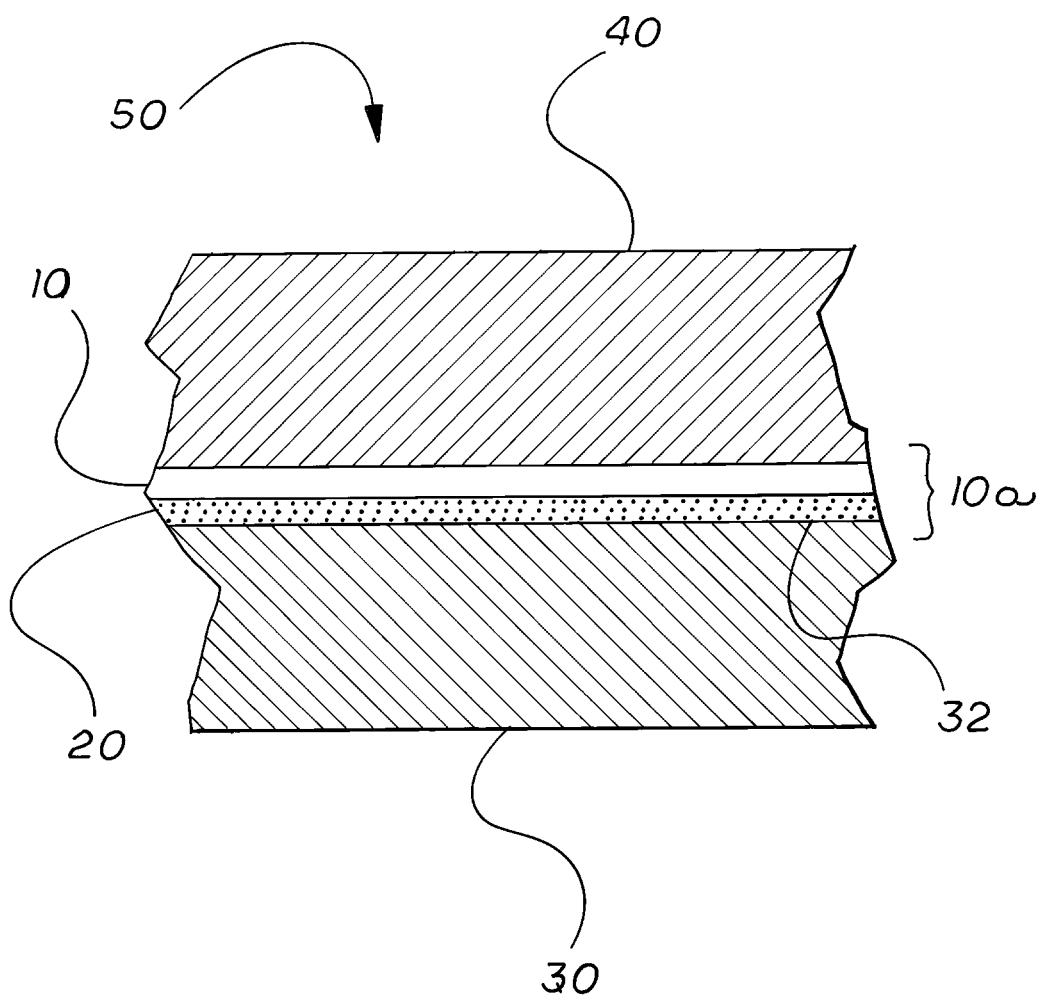
FIG. 3 is a side elevation view illustrating a road employing a dimensionally-stabilized composite fabric made in accordance with the present invention.

FIG. 3 shows a paved surface 40 which is reinforced and waterproofed according to the method of the invention. A first step of the method is to apply a layer of liquefied asphalt, onto a surface 32 of a road bed 30, such as a paved surface, a gravel base, a sand gravel base, and the like. In one aspect, the liquefied asphalt is applied onto the surface 32 in an amount of at least 0.1 gallons per square yard of surface 32. The liquefied asphalt can be a bituminous material which is fluid at the time of application and subsequently firms into a substantially solid state. For example, the liquefied asphalt can be a molten asphalt or an asphalt emulsion, and the like. A molten asphalt is asphalt heated to a temperature sufficiently high, for example, above about 250° F. (about 121° C.), for a sufficient duration such that the asphalt is in a molten state. An asphalt emulsion is dispersed in water with an emulsifier.

The layer of liquefied asphalt and the like can be applied in any amount which is suitable for penetrating and soaking the composite fabric 10 described above to form a tack layer 20 as demonstrated in FIG. 3. Typically, the liquefied asphalt is applied at a rate within a range of from about 0.1 gallon/square yard to about 0.5 gallon/square yard, the optimum rate depending on the weight of the composite fabric 10. Referring to FIG. 3, the composite fabric 10/tack layer 20 combination is indicated by reference number 10a. The liquefied asphalt can be applied by any suitable method known in the art to form a layer, such as by spraying or by pouring and spreading to form the layer.

As indicated above, the composite fabric 10 is applied over the liquefied asphalt, that is, while the liquefied asphalt is still in the fluid condition. In one aspect, the composite fabric 10 is sufficiently absorbent on the low surface area side 13 and/or porous that the liquefied asphalt penetrates and soaks the composite fabric 10 to form the tack layer 20. As illustrated in FIG. 3, the tack layer comprising liquefied asphalt 20 includes a bottom portion below the composite fabric 10 and a top portion which saturates the composite fabric 10. However, the liquefied asphalt could also be located entirely inside the composite fabric 10 after it is applied. In one aspect, the composite fabric 10 can absorb at least about 0.1 gallon/square yard (about 0.32 liter/square meter) of the liquefied asphalt.

In another aspect, the liquefied asphalt and the like can be applied directly to the composite fabric 10 to form the tack layer 20. Application can occur by spraying, calendaring, or any other method of applying a liquid to a substrate known in the art. Typically, the tack layer 20 is formed on the high surface area side 13 of the substrate 11. As discussed above, the liquefied asphalt, and the like, penetrates the substrate 11. Thus, the tack layer is formed within the substrate 11 and, optionally, can extend outwardly from the substrate 11.

A sufficient amount of liquefied asphalt is applied, and the composite fabric 10 soaks up enough liquefied asphalt, to form a strong bond with the paved surface 40 and with the layer of paving material 30 (described below), and to form a water barrier which prevents water from penetrating into the paved surface from above. Preferably, the composite fabric 10 is substantially completely saturated with the liquefied asphalt, such that the liquefied asphalt penetrates from the high surface area side 13 to the low surface area side 12 of the composite fabric 10.

As discussed above, the composite fabric 10 may be wrapped in a continuous roll having a width within a range of from about 3 feet to about 24 feet. The composite fabric 10 is applied over the liquefied asphalt by unrolling the composite fabric from the roll onto the liquefied asphalt.

The liquefied asphalt is allowed to firm up (at least partially solidify) at some time after the application of the composite fabric, forming the tack layer 20. Usually, it is allowed to firm up before the application of the paving material described below. For example, the molten asphalt is allowed to firm up by cooling, the asphalt emulsion is allowed to firm up by water evaporation.

After the composite fabric 10 is applied to the liquefied asphalt, a layer of paving material 40 is applied over the composite fabric 10. The paving material 40 can be any material suitable for providing a top surface layer of a paved surface, such as an asphalt paving material (a mixture of asphalt and aggregate). The paving material is usually applied in a heated condition, and then allowed to cool.

When the reinforcement of the paved surface is completed, the penetration of the composite fabric 10 by the liquefied asphalt (now at least partially solidified) forms a strong bond between the composite fabric 10, the asphalt, the paved surface 30 and the layer of paving material 40. This creates a strong, monolithic paved surface structure which is resistant to damage. The high tensile and mechanical strength of the composite fabric 10 provides mechanical reinforcement and dimensional-stability to the paved surface. Additionally, the penetration of the composite fabric 10 by the asphalt forms a water barrier or waterproof membrane that prevents water from penetrating into the paved surface from above and causing damage.

In another aspect, the method comprises pavement of a non-paved surface by applying the liquefied asphalt on a prepared unpaved surface, applying the composite fabric 10 over the liquefied asphalt and the prepared unpaved surface, and applying the paving material over the composite fabric 10 to form a reinforced road 50. The method can be used in the construction of a new paved surface, in the rejuvenation of an existing paved surface, or to repair a crack, pothole or other defect in an existing paved surface. When repairing a defect in a paved surface, a first step of the method is to apply a layer of liquefied asphalt on a paved surface having a defect. When the defect is a crack in the paved surface, the liquefied asphalt may be applied over the crack without initial preparation of the crack, or alternatively the crack may be filled with an appropriate crack filler such as those meeting the requirements of ASTM D-3405 or D-1190 or other suitable material. When the defect is a pothole in the paved surface, usually the pothole is initially filled with a material conventionally used for filling potholes, such as an asphalt paving material. Then the liquefied asphalt is applied over the filled pothole. Badly broken or rough pavement may require milling or placement of a leveling course before application of the liquefied asphalt. The composite fabric 10 is then applied over the liquefied asphalt and the defect. Finally, a layer of paving material is applied over the composite fabric and the defect. When the repair is completed, the composite fabric holds the paved surface around the defect together, and the mat/asphalt waterproof membrane prevents water from penetrating into the defect from above and causing further damage.

Certain of the terms used herein are defined as follows:

"Fiber" means a material in which the length to diameter ratio is greater than about 10. Fiber is typically classified according to its diameter. Filament fiber is generally defined as having an individual fiber diameter greater than about 15 denier, usually greater than about 30 denier per filament. Fine denier fiber generally refers to a fiber having a diameter less than about 15 denier per filament. Microdenier fiber is generally defined as fiber having a diameter less than about 100 microns denier per filament.

"Filament fiber" or "monofilament fiber" means a continuous strand of material of indefinite (i.e., not predetermined) length, as opposed to a "staple fiber".

"Staple fiber" is a discontinuous strand of material of definite length (i.e., a strand which has been cut or otherwise divided into segments of a predetermined length). Staple fibers made in accordance with the present invention can be made into non-woven webs and fabrics using any methods currently used or hereafter discovered, including spunlacing, needle-punching, thermal bonding, and card-and-bind processing.

"Meltspun fibers" are fibers formed by melting the thermoplastic polymer composition described herein and then drawing the fiber in the melt to a diameter (or other cross-section shape) less than the diameter (or other cross-section shape) of the die.

"Spunbond fibers" are fibers formed by extruding the molten thermoplastic polymer composition described herein as filaments through a plurality of fine, usually circular, die capillaries of a spinneret (not shown). The diameter of the extruded filaments is rapidly reduced, and then the filaments are deposited onto a collecting surface to form a web of randomly dispersed fibers with average diameters generally between about 7 and about 30 microns.

"Nonwoven" means a web or fabric having a structure of individual fibers or threads which are randomly interlaid, but not in an identifiable manner as is the case of a knitted or woven fabric.

"Yarn" means a continuous length of twisted or otherwise entangled plurality of filaments (i.e. multifilament) which can be used in the manufacture of woven or knitted fabrics and other articles. Yarn can be covered or uncovered. Covered yarn is yarn at least partially wrapped within an outer covering of another fiber or material, for example, cotton or wool.

Fibers and yarns can be made into fabrics using any methods currently used or hereafter discovered for making fibers and yarns into fabrics, including but not limited to weaving and knitting.

"Strand" means a continuous length of a structure of one or more fibers bundled together. Although not required, the strand is typically of a substantially rectangular cross-sectional shape. Yet, strands having other cross-sectional geometric shapes, such as oval, round, square, triangular, etc. can be employed in the present invention. As indicated above, it is beneficial for rolling of the composite fabric 10 if the respective strands lie substantially flat on the substrate 11.

"Oblique angle" means an angle formed by the position of a specified strand with respect to a reference strand that is neither parallel with nor perpendicular to the referenced strand.

The fibers or monofilaments comprising the aforementioned yarns are typically thermoplastic polymers. Additionally, yarns comprising natural fibers can be employed in the present invention. Such natural yarns should be selected on their ability to with withstand the heat and temperature of molten asphalt without being degraded or burned. Polymers which may be used to produce the geotextile fabric of the present invention include, but are not limited to, polyamides (for example, any of the nylons), polyimides, polyesters (for example, high tenacity polyesters, polyethylene terephthalate, polybutylene terephthalate, and aromatic polyesters, for example, Vectran®), polyacrylonitriles, polyphenylene oxides, fluoropolymers, acrylics, polyolefins (for example, low density polyethylene (LDPE), linear low density polyethylene (LLDPE), high density polyethylene (HDPE), co-polymers of polyethylene, polypropylene, and higher poly-olefins), polyphenylene sulfide, polyetherimide, polyetheretherketone, polylactic acid (also known as poly-lactide), aramids (for example, para-aramids, which include Kevlar®, Technora®, Twaron®, and meta-paramids, for example, Nomex®, and Teijinconex®), aromatic ether ketones, vinalon, and the like, and blends of such polymers which can be formed into microfilaments. Further, the fibers can comprise other agents, materials, dyes, plasticizers, etc. which are employed in the textile industry. It will be understood that any materials capable of producing fibers or microfilaments suitable for use in the instant fabric of the present invention fall within the scope of the present invention and can be determined without departing from the spirit thereof.

EXAMPLES

Tensile tests were conducted of two different composite fabrics as described in Examples 1 and 2 below. The tests were conducted in accordance with ASTM International test ASTM D 5617-04 (2010) entitled "Standard Test Method for Multi-axial Tension Test for Geosynthetics.

Example I

Three samples of a composite fabric formed of a 4.2 ounce/yard2 polypropylene nonwoven fabric having equi-distantly-spaced 413 yard/pound (yield) fiberglass strands positioned in the 0° and the 90° directions. The composite fabric thickness was 70 mils. Strand spacing in both directions was approximately 1.5 inch, and the strands formed a grid of squares. Binder fiber secured the strands to the fabric. The results of the test are presented in Table I.

TABLE I

| | Test Replicate Number | | |
| --- | --- | --- | --- |
| Parameter | Sample 1 | Sample 2 | Sample 3 |
| Resistance at 0.5% Strain (psi) | 356 | 312 | 348 |
| Resistance at 1% Strain (psi) | 433 | 359 | 413 |
| Resistance at 2% Strain (psi) | 558 | 482 | 586 |
| Resistance at 3% Strain (psi) | 623 | 513 | 651 |
| Resistance at 5% Strain (psi) | 742 | 614 | 743 |
| Maximum Stress (psi) | 952 | 936 | 924 |
| Maximum Strain at Nonwoven Rupture (%) | 20.3 | 19.6 | 19.3 |

Example 2

Three samples of a composite fabric in accordance with the present invention were formed of a 2.1 ounce/yard2 polypropylene nonwoven fabric having equidistantly-spaced 413 yield fiberglass strands positioned in the 0°, 90°, and 45° directions as presented in FIG. 1. The composite fabric thickness was 59 mils. Strand spacing in all directions was the same. Binder fiber secured the strands to the fabric. The results of the test are presented in Table 2.

TABLE 2

| Parameter | Test Replicate Number | | |
|---|---|---|---|
| | Sample 1 | Sample 2 | Sample 3 |
| Resistance at 0.5% Strain (psi) | 653 | 651 | 525 |
| Resistance at 1% Strain (psi) | 792 | 693 | 800 |
| Resistance at 2% Strain (psi) | 903 | 856 | 1080 |
| Resistance at 3% Strain (psi) | 1007 | 903 | 1132 |
| Resistance at 5% Strain (psi) | 1198 | 911 | 1154 |
| Maximum Stress (psi) | 1410 | 1118 | 1398 |
| Maximum Strain at Nonwoven Rupture (%) | 13.6 | 13.8 | 14.5 |

As indicated in Table 2, the inventive fabric showed significantly improved tensile strength as compared to the composite of Example 1. It should be noted that the full strength of the inventive fabric could not be determined because the strands of the composite tore at the clamps securing the composite to the test vessel. The strands of the inventive composite did not tear in response to bladder pressure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A composite fabric comprising:
   a. a substrate comprising a nonwoven fabric comprising polymeric fibers having melting point greater than 320° F. (160° C.), the substrate having a low surface area side and a high surface area side, the high surface area side having a greater absorbency than the low surface side, and the low surface area side comprising fused fibers;
   b. a plurality of first strands disposed across the substrate;
   c. a plurality of second strands disposed across the substrate and being substantially perpendicular to the first strands;
   d. a plurality of third strands disposed across the substrate and being positioned at a first oblique angle with respect to either the plurality of first strands or the plurality of second strands;
   e. a plurality of fourth strands disposed across the substrate and being positioned at a second oblique angle with respect to either the plurality of first strands or the plurality of second strands and being substantially perpendicular to the plurality of third strands;
   f. a plurality of binding fibers disposed through and across the entire substrate, the plurality of first strands, the plurality of second strands, the plurality of third strands, and the plurality of fourth strands along an axis substantially parallel with the plurality of first strands, such that the plurality of binding fibers secures the plurality of first strands, the plurality of second strands, the plurality of third strands, and the plurality of fourth strands to the substrate and is present between strands of the first plurality of strands; and
   g. optionally a tack layer disposed on the high surface area side to act as a water barrier for the composite fabric;
   wherein all strands are disposed across the high surface area of the substrate and comprise mineral fibers; and
   wherein no more than three of the plurality of first strands, the plurality of second strands, the plurality of third strands, and the plurality of fourth strands overlap at intersections of the plurality of first strands, the plurality of second strands, the plurality of third strands, and the plurality of fourth strands so that the composite fabric is free of protrusions; and
   wherein a load positioned on the composite fabric is distributed across the plurality of first strands, the plurality of second strands, the plurality of third strands, and the plurality of fourth strands.

2. The composite fabric of claim 1, wherein the first oblique angle is substantially a 45° angle.

3. The composite fabric of claim 1, wherein the second oblique angle is substantially a 45° angle.

4. The composite fabric of claim 1, wherein the plurality of first strands, the purity of second strands, the plurality of third strands, or the plurality of fourth strands are a heat-softenable mineral material, a glass, a rock slag, any blend thereof, or any mixture thereof.

5. The composite fabric of claim 1, wherein the plurality of first strands, the plurality of second strands, the plurality of third strands, or the plurality of fourth strands are fiberglass strands.

6. The composite fabric of claim 4, wherein the plurality of first strands, the plurality of second strands, the plurality of third strands, or the plurality of fourth strands have a basis weight within a range from about 0.5 to about 10 pounds per hundred square feet (about 0.2 kg/m2 to about 0.42 kg/m2).

7. The composite fabric of claim 1, wherein the polymeric fibers are formed of a polyamide, a polyimide, a polyester, a high tenacity polyester, polyethylene terephthalate (PET), polybutylene terephthalate, polytetrafluoroethylene (PTFE), an aromatic polyester, a polyurethane, a polycarbonate, a polystyrene, an acrylic, a vinyl polymer, a polyphenylene, a polyacrylonitrile, polyphenylene sulfide (PPS), a polyphenylene oxide, a fluoropolymers, a polyolefins, low density polyethylene (LDPE), linear low density polyethylene (LLDPE), high density polyethylene (HDPE), a co-polymer of polyethylene, polypropylene, and higher polyolefins, a polyphenylene sulfide, a polyetherimide, a polyetheretherketone, a polylactic acid (also known as polylactide), an aramid, an aromatic ether ketone, a vinalon, a derivative of any of such polymers, a blend of any of such polymers, or any combination thereof.

8. The composite fabric of claim 1, wherein the composite fabric is employed as a base for a civil structure.

9. The composite fabric of claim 1, wherein the composite fabric is employed as a base for a paved surface.

10. A composite fabric comprising:
   a. a substrate comprising a nonwoven fabric comprising polymeric fibers having melting point greater than 320° F. (160° C.), the substrate having a low surface area side and a high surface area side, the high surface area side having a greater absorbency than the low surface side, and the low surface area side comprising fused fibers;

b. a plurality of first strands disposed across the substrate and oriented in a first direction;

c. a plurality of second strands disposed across the substrate and being oriented in a second direction, the second direction being non-parallel with the first direction;

d. a plurality of third strands disposed across the substrate and being oriented in a third direction, the third direction being non-parallel with either the first direction or the second direction;

e. a plurality of fourth strands disposed across the substrate and being oriented in a fourth direction, the fourth direction being non-parallel with the first direction, the second direction, and the third direction;

f. a plurality of binding fibers disposed through and across the entire substrate, the plurality of first strands, the plurality of second strands, the plurality of third strands, and the plurality of fourth strands along an axis substantially parallel with the plurality of first strands, such that the plurality of binding fibers secures the plurality of first strands, the plurality of second strands, the plurality of third strands, and the plurality of fourth strands, to the substrate and is present between strands of the first plurality of strands; and g. optionally, a tack layer disposed on the high surface area side to act as a water barrier for the composite fabric;

wherein all strands comprise mineral fiber and are disposed across the high surface area of the substrate; and wherein no more than three of the plurality of the first strands, the plurality of second strands, the plurality of third strands, and the plurality of fourth strands overlap at intersections of the plurality of first strands, the plurality of second strands, the plurality of third strands, and the plurality of fourth strands so that the composite fabric is free of protrusions; and wherein a load positioned on the composite fabric is distributed across the plurality of first strands, the plurality of second strands, the plurality of third strands, and the plurality of fourth strands.

11. The composite fabric of claim 10, further comprising a fifth strand positioned across the substrate and being oriented at an angle which is either less than 90 degrees but greater than 45 degrees or less than 45 degrees but greater than 0 degrees with respect to the plurality of first strands.

12. The composite fabric of claim 11, further comprising a sixth strand positioned across the substrate and being oriented at an angle which is either less than 90 degrees but greater than 45 degrees or less than 45 degrees but greater than 0 degrees with respect to the plurality of third strands.

13. The composite fabric of claim 10, further comprising a fifth strand positioned across the substrate and being oriented in a fifth direction, the fifth direction being non-parallel with the first direction, the second direction the third direction, and the fourth direction and secured to the substrate by the plurality of binder fibers.

14. The composite fabric of claim 13, further comprising a sixth strand positioned across the substrate and being oriented in a sixth direction, the sixth direction being non-parallel with the first direction, the second direction; the third direction, the fourth direction, and the fifth direction and secured to the substrate by the plurality of binder fibers.

15. The composite fabric of claim 10, wherein the plurality of first strands, the plurality of second strands, the plurality of third strands, or the plurality of fourth strands are a heat-softenable mineral material, a glass, a rock slag, any blend thereof, or any, mixture thereof.

16. The composite fabric of claim 10, wherein the plurality of first strands, the plurality of second strands, the plurality of third strands, or the plurality of fourth strands are fiberglass strands.

17. The composite fabric of claim 16, wherein the plurality of first strands, the plurality of second strands, the plurality of third strands, or the plurality of fourth strands have a basis weight within a range from about 0.5 to about 10 pounds per hundred square feet (about (12 kg/m2 to about (142 kg/m2).

18. The composite fabric of claim 10, wherein the polymeric fibers are formed of a polyamide, a polyimide, a polyester, a high tenacity polyester, polyethylene terephthalate (PET), polybutylene terephthalate, polytetrafluoroethylene (PTFE), an aromatic polyester, a polyurethane, a polycarbonate, a polystyrene, an acrylic, a vinyl polymer, a polyphenylene, a polyacrylonitrile, polyphenylene sulfide (PPS), a polyphenylene oxide, a fluoropolymer, a polyolefin, low density polyethylene (LDPE), linear low density polyethylene (LLDPE), high density polyethylene (HDPE), a co-polymer of polyethylene, polypropylene, and higher polyolefins, a polyphenylene sulfide, a polyetherimide, a polyetheretherketone, a polylactic acid (also known as polylactide), an aramid, an aromatic ether ketone, a vinalon, a derivative of any of such polymers, a blend of any of such polymers, or any mixture thereof.

19. The composite fabric of claim 10, wherein the composite fabric is employed as a base for a civil structure.

20. The composite fabric of claim 10, wherein the composite fabric is employed as a base for a paved surface.

21. A road comprising:

a layer of asphalt disposed on a road bed, a composite fabric disposed on the asphalt, and a layer of paving material disposed on the composite fabric; the composite fabric comprising:

a. a substrate comprising a nonwoven fabric comprising polymeric fibers having melting point greater than 320° F. (160° C.), the substrate having a low surface area side and a high surface area side, the high surface area side having a greater absorbency than the low surface side, and the low surface area side comprising fused fibers;

b. a plurality of first strands disposed across the substrate and oriented in a first direction;

c. a plurality of second strands disposed across the substrate and being oriented in a second direction, the second direction being non-parallel with the first direction;

d. a plurality of third strands disposed across the substrate and being oriented in a third direction, the third direction being non-parallel with the first direction or the second direction;

e. a plurality of fourth strands disposed across the substrate and being oriented in a fourth direction, the fourth direction being non-parallel with the first direction, the second direction, and the third direction; and f. a plurality of binding fibers disposed through and across the entire substrate, the plurality of first strands, the plurality of second strands, the plurality of third strands, and the plurality of fourth strands along an axis substantially parallel with the plurality of first strands, such that the plurality of binding fibers secures the plurality of first strands, the plurality of second strands, the plurality of third strands, and the plurality of fourth strands to the substrate and is present between strands of the first plurality of strands; and g. optionally, a tack layer disposed on the high surface area side to act as a water barrier for the composite fabric;

wherein:

all strands are disposed across the high surface area of the substrate and are mineral fibers; and wherein no more than three of the plurality of first strands, the plurality of second strands, the plurality of third strands, and the plurality of fourth strands overlap at intersections of the plurality of first strands, the plurality of second strands, the plurality of third strands, and the plurality of fourth strands so that the composite fabric is free of protrusions;

wherein a load positioned on the composite fabric is distributed across the plurality of first strands, the plurality of second strands, the plurality of third strands, and the plurality of fourth strands.

22. The composite fabric of claim 1, wherein the tack layer comprises a hot-mix bituminous mixture layer positioned between the substrate and the plurality of first strands, the plurality of second strands, the plurality of third strands, and the plurality of fourth strands or on the plurality of first strands, the plurality of second strands, the plurality of third strands, and the plurality of fourth strands which are disposed on the substrate.

23. The composite fabric of claim 10, wherein the tack layer comprises a hot-mix bituminous mixture layer positioned between the substrate and the plurality of first strands, the plurality of second strands, the plurality of third strands, and the plurality of fourth strands or on the plurality of first strands, the plurality of second strands, the plurality of third strands, and the plurality of fourth strands which are disposed on the substrate.

24. The road of claim 21, wherein the tack layer comprises a hot-mix bituminous mixture layer positioned between the substrate and the plurality of first strands, the plurality of second strands, the plurality of third strands, and the plurality of fourth strands or on the plurality of first strands, the plurality of second strands, the plurality of third strands, and the plurality of fourth strands which are disposed on the substrate.

25. The road of claim 21, wherein the plurality of first strands, the plurality of second strands, the plurality of third strands, or the plurality of fourth strands are a heat-softenable mineral material, a glass, a rock slag, any blend thereof, or any mixture thereof.

26. The road of claim 21, wherein the plurality of first strands, the plurality of second strands, the plurality of third strands, or the plurality of fourth strands are fiberglass strands.

27. The road of claim 21, wherein the plurality of first strands, the plurality of second strands, the plurality of third strands, or the plurality of fourth strands have a basis weight within a range from about 0.5 to about 10 pounds per hundred square feet (about 0.2 kg/m$^2$ to about 0.42 kg/m2).

28. The road of claim 21, wherein the polymeric fibers are formed of a polyamide, a polyimide, a polyester, a high tenacity polyester, polyethylene terephthalate (PET), polybutylene terephthalate, polytetrafluoroethylene (PTFE), an aromatic polyester, a polyurethane, a polycarbonate, a polystyrene, an acrylic, a vinyl polymer, a polyphenylene, a polyacrylonitrile, polyphenylene sulfide (PPS), a polyphenylene oxide, a fluoropolymer, a polyolefin, low density polyethylene (LDPE), linear low density polyethylene (LLDPE), high density polyethylene (HDPE), a co-polymer of polyethylene, polypropylene, and higher polyolefins, a polyphenylene sulfide, a polyetherimide, a polyetheretherketone, a polylactic acid (also known as polylactide), an aramid, an aromatic ether ketone, a vinalon, a derivative of any of such polymers, a blend of any of such polymers, or any mixture thereof.

29. The composite fabric of claim 1, wherein the plurality of first strands, the plurality of second strands, the plurality of third strands, and the plurality of fourth strands are fiberglass strands.

30. The composite fabric of claim 10, wherein the plurality of first strands, the plurality of second strands, the plurality of third strands, and the plurality of fourth strands are fiberglass strands.

31. The road of claim 21, wherein the plurality of first strands, the plurality of second strands, the plurality of third strands, and the plurality of fourth strands are fiberglass strands.

* * * * *